United States Patent [19]

Leviton

[11] Patent Number: 5,329,121
[45] Date of Patent: Jul. 12, 1994

[54] ROTARY ENCODING DEVICE WITH POLYGONAL REFLECTOR AND CENTROID DETECTION

[75] Inventor: Douglas B. Leviton, Dunkirk, Md.

[73] Assignee: The United States of America as represented by the Administrator of the National Aeronautics and Space Administration, Washington, D.C.

[21] Appl. No.: 22,219

[22] Filed: Feb. 25, 1993

[51] Int. Cl.$^5$ ............................................. G01D 5/34
[52] U.S. Cl. ........................... 250/231.13; 250/231.18
[58] Field of Search .............. 250/230, 231.13, 231.14, 250/231.18, 237 G; 356/375

[56] References Cited

U.S. PATENT DOCUMENTS

| | | | |
|---|---|---|---|
| 5,103,090 | 4/1992 | Weiner et al. | 250/231.13 |
| 5,126,561 | 6/1992 | Nakazawa et al. | 250/231.13 |
| 5,247,173 | 9/1993 | Benchetrit et al. | 250/230 |

Primary Examiner—David C. Nelms
Attorney, Agent, or Firm—Paul S. Clohan, Jr.; R. Dennis Marchant; Guy M. Miller

[57] ABSTRACT

A device for positioning encoding of a rotating shaft in which a polygonal mirror having a number of facets is mounted to the shaft and a light beam is directed towards the facets. The facets of the polygonal mirror reflect the light beam such that a light spot is created on a linear array detector. An analog-to-digital converter is connected to the linear array detector for reading the position of the spot on the spots on the linear array detector. A microprocessor with memory is connected to the analog-to-digital converter to hold and manipulate the data provided by the analog-to-digital converter on the position of the spot and to compute the position of the shaft based upon the data from the analog-to-digital converter.

17 Claims, 5 Drawing Sheets

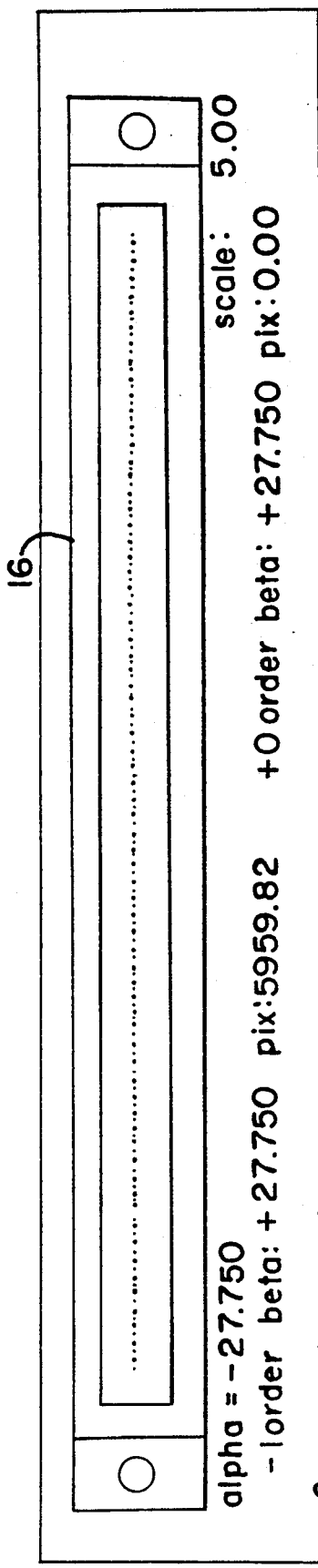
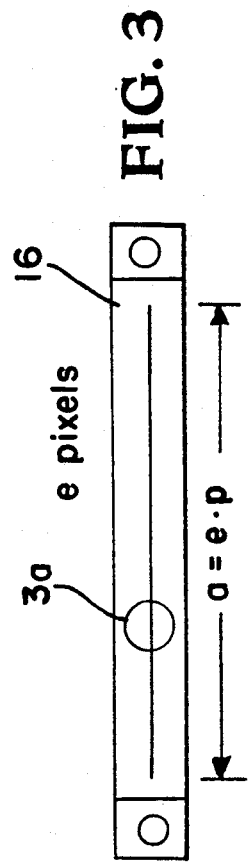
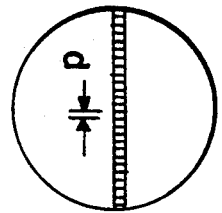
FIG. 4
FIG. 3
FIG. 3a
alpha = −27.750
−1 order beta: +27.750  pix:5959.82       +0 order beta: +27.750 pix:0.00
$\theta$ = 106.499852°
x offset = +42%
Center $\beta$ = +24.7°
$\beta$ half-range = 11.7°
lambda = 0.633 $\mu$m
Beam dia. = 1.5 mm
Lines/mm = 0
# of facets: 32
Facet radius = 40mm
Sector angle = 11.25°
Facet length = 7.88 mm
# of pixels: 8000
Pixels are 9 $\mu$m
Array length = 72 mm

ROTARY ENCODING DEVICE WITH POLYGONAL REFLECTOR AND CENTROID DETECTION

ORIGIN OF THE INVENTION

The invention described herein was made by an employee of the United States Government, and may be manufactured and used by or for the Government for governmental purposes without the payment of any royalties thereon or therefor.

TECHNICAL FIELD

This invention relates generally to rotary encoding devices and more particularly to an absolute rotary encoding device with high angular sensitivity.

CROSS REFERENCE TO RELATED APPLICATIONS

This invention is related to an invention shown and described in U.S. patent application Ser. No. 07/971,035, entitled "Rotary Encoding Device", filed in the name of Douglas B. Leviton on, Nov. 3, 1992, now U.S. Pat. No. 5,266,796. The above is assigned to the assignee of the present invention.

BACKGROUND ART

Many scientific, industrial, military weapons systems, and aerospace applications require precise and accurate knowledge of the angular orientation of a shaft or other rotating object. Typically, this knowledge is provided by a rotary shaft angle encoder. Encoders of the highest practical precision are relative or incremental in nature, i.e. they resolve very small angular changes and keep track of accumulated change relative to some reference angle. In these encoders the angular information generally is lost if this reference angle becomes corrupted, e.g., through power interruption or upset by electromagnetic interference. There are also absolute encoders which provide angle information which is independent of any reference angle (except of course its own calibration, traceable to some standards maintenance organization such as NIST—formerly NBS). The absolute nature of these encoders is generally accompanied by only low to moderate angular sensitivity. Those which have the highest sensitivity are exorbitantly expensive ($30,000 to $100,000). Further, some of these encoders often achieve additional sensitivity by means of gear trains which are subject to hysteresis which limit accuracy and make angular determination indirect.

STATEMENT OF THE INVENTION

It is therefore an object of the present invention to provide an encoding device having high absolute accuracy and sensitivity.

Another object of the present invention is to provide an encoding device that is compact and reliable.

A further object of the present invention is to provide an encoding device with continuous angular coverage for an unlimited number of turns and which can also keep track of the total angular displacement when there have been numerous turns (assuming no power interruption).

A still object of the present invention is to provide an encoding device useable at moderately high speed (high conversion bandwidth) and which lends itself to tachometric applications.

Another object of the present invention is to provide an encoding device with redundancy attainable through additional read channels.

A further object of the present invention is to provide an encoding device that is comparatively affordable to manufacture.

A still further object of the present invention is to provide an encoding device with possible use as a secondary angular calibration standard.

Another object of the present invention is to provide an encoding device that will provide vibration/jitter information available from computation of perturbed spot shapes.

These and other objects are achieved by providing an encoding device for position encoding of a rotating shaft in which a polygonal mirror having a number of facets is mounted to the shaft and light beam is directed towards the facets. The facets of the polygonal mirror reflect the light beam such that a light spot is created on a linear array detector. An analog-to-digital converter is connected to the linear array detector for reading the position of the spot on the linear array detector. A microprocessor with memory is connected to the analog-to-digital converter to hold and manipulate the data provided by the analog-to-digital converter on the position of the spot and to compute the position of the shaft based upon the data from the analog-to-digital converter.

BRIEF DESCRIPTION OF THE DRAWINGS

FIG. 3 is a detail view of a photodiode array used with this encoder.

FIG. 4 is a view of a sample encoder design.

DETAILED DESCRIPTION OF THE INVENTION

Figure 1:
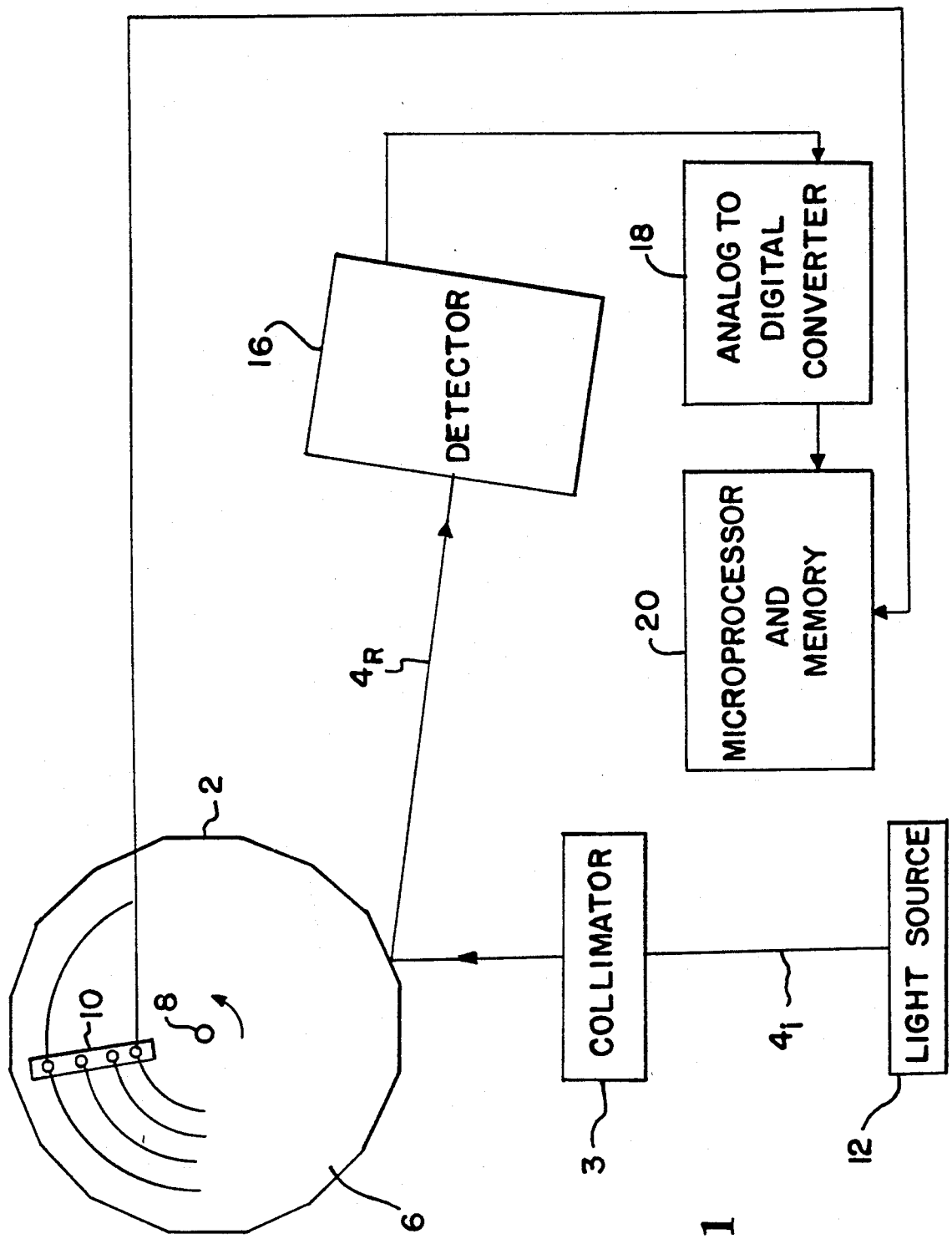
FIG. 1 is a schematic block diagram of an encoding device according to the present inventive concepts.

My inventive encoding device is a combination of several recent innovations in optical and electro-optic technologies. These components and their important characteristics are listed below. To see how the components are implemented in the device, refer to the functional block diagram (FIG. 1) and the discussion that follows under Principles of Operation for the Encoding Device.

Light source 12 can be an LED, a filament lamp (with or without a filter) with gradient index (GRIN) lens collimator 3, a diode laser, or a compact HeNe gas laser or solid state laser (e.g., laser diode-pumped, frequency-doubled Nd:YAG or Nd:YLF) which emits beam $4_i$ and can be delivered by a small diameter fiber optic cable. Light source 12 is thus compact, reliable, and affordable and is directed in the form of a small diameter beam $4_i$ with low divergence at polygonal mirror 6, available with very small facet angle errors (subarcsecond) and excellent optical flatness on facets $2_0$–$2_{N-}$. Attached to polygonal mirror 6 is a 4 to 6 bit binary or Gray code encoder 10 (for facet $2_i$ identification) which is simple, reliable, established and well-understood technology.

Position sensitive detector 16 can be a CCD array detector having a linear array of a large number of diodes (256-8000) with very small pixels (7-35 μm) providing high speed/photometrically linear and uniform response to light beam $4_R$ provided by source 12, and has high electronic throughput and is reliable. Connected to detector 16 is 8 to 12+ bit analog-to-digital converter 18 to read out the linear array of diodes in detector 16. A floating point microprocessor 20 with double precision math processing capability and memory to hold and manipulate array detector 16 data is used and will compute shaft 8 angle absolutely based on information from facet identifying encoder 10, and positions of light spots on linear array detector 16. Microprocessor 20 is currently available in many forms with high speed and reliability and more than adequate computing capacity. Digital signal processors (DSP's) having embedded filtering and other mathematical functions could also be sued to compute the spot location.

Principles of Operation of Encoding Device

The operation of the device relies on the simple reflection law of Snell which states that the angle of reflection of light ray from a specular surface is equal and opposite to the angle of incidence of the ray with the surface or $\beta = -\alpha$, an expression which is true for any wavelength of light.

Figure 2:
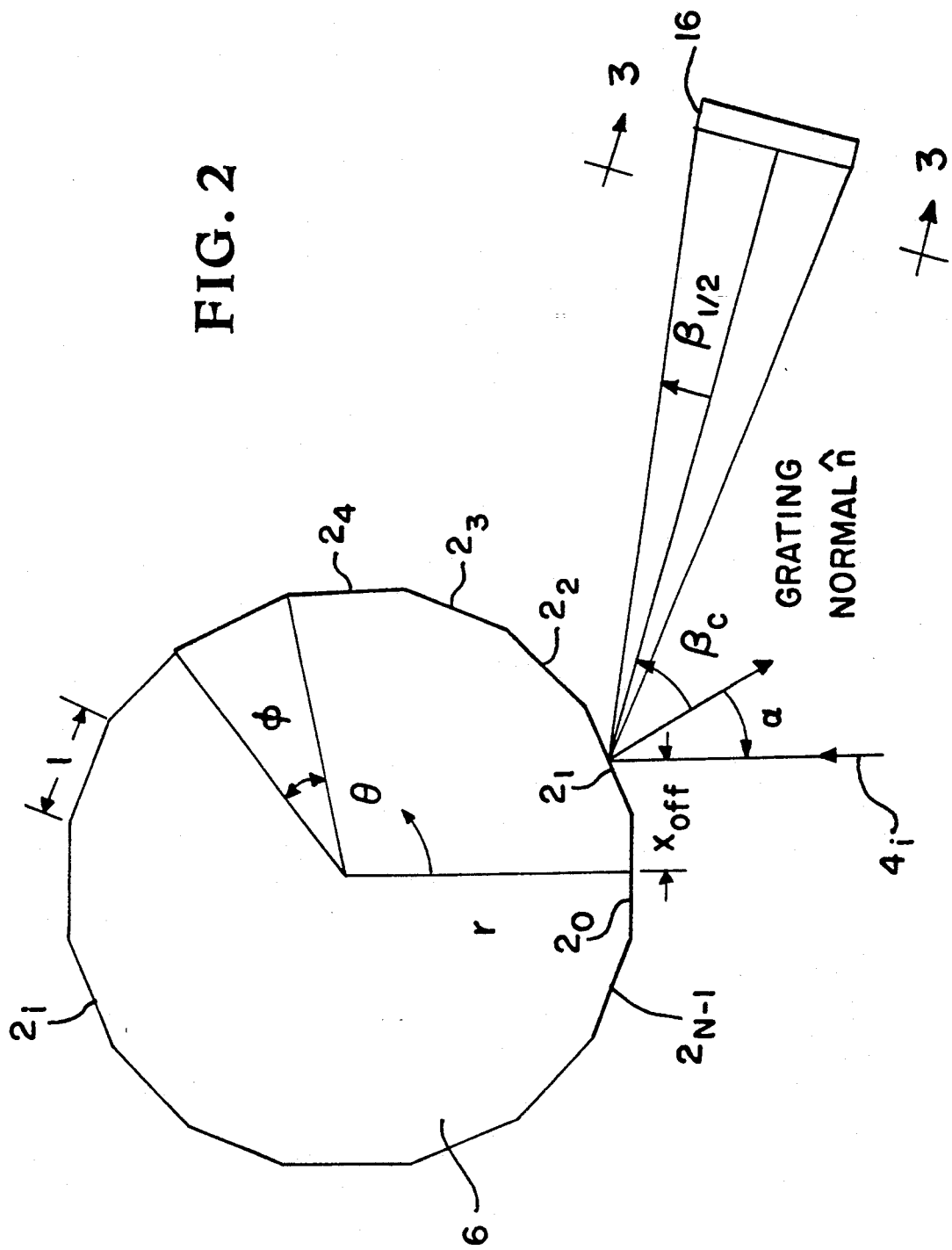
FIG. 2 is a detail view of the geometry in the encoding device shown in FIG. 1.

To begin the description of the device's operation, for conceptual reasons only, we assume two simple things: first, that light beams can be thought of as geometric rays; and second, that the first time we see the situation in FIGS. 1 and 2, shaft 8 angle $\theta$ is such that the incident light beam is just intersecting the upper right end of the facet depicted. We will begin by considering counter-clockwise shaft 8 motion (positive sense for $\theta$). Thus, the incident beam $4_i$ from the light source 12 in FIG. 1 will seem to creep down the facet under consideration, changing its angle of incidence on the facet, as shaft 8 rotates.

The basic, observable phenomenon in this system will be the movement of a spot of light on linear array detector 16 where beam $4_R$ reflected from the illuminated facet $2_1$ intersects the line segment in space which is linear array 16. At any instant in time, shaft 8 angle information is in fact held by the exact location of this spot on linear array 16, i.e., the intersection of the reflected ray $4_R$ with the line segment.

To see why this is so, consider the following. As shaft 8 (and polygonal mirror 6) rotates through an angle $\Delta\theta$, the angle of incidence $\alpha$ of light beam $4_i$ with respect to facet $2_i$ normal for a given facet $2_i$ changes by $\Delta\alpha$, exactly $= \Delta\theta$, which causes the angle of the reflected ray $4_R$ to deviate by exactly $-\Delta\beta$. The reflected light spot thus moves along fixed linear array 16. It does so in a way governed by the fact that reflected ray $4_R$ obeys Snell's law at all times. The location of the light spot on array 16 identifies a unique angular orientation of illuminated facet $2_i$. As long as it is known which facet $2_i$ is illuminated, the angle of shaft 8 is completely determined throughout its range of rotation.

The behavior just described continues until the next facet $2_i$ comes around, at which point the behavior repeats itself. The desired behavior is called "modulo $2\pi/N$," where "N" is the number of facets $2_i$ on polygonal mirror 6 and $2\pi/N$ is called the "sector angle" in radians. The absolute shaft 8 angle is obtained by knowing the angular offset for illuminated facet $2_i$ and adding the uniquely defined angular component governed by Snell's law and manifested in the locations of light spots on linear array 16. The angular offset is simply facet $2_i$ number times the sector angle, where facets 2 are numbered 0 through $N-1$. The angular component depending on Snell's law is computed from knowledge of only the device geometry which is assumed to be invariant. These geometric aspects are polygon dimensions, linear array placement, and offset distance from shaft 8 center where incident beam $4_i$ strikes the polygon, defined as $x_{off}$.

To complete the description of the overall system, the location information of the light spot on array detector 16 is read from array 16 by conventional means through analog-to-digital converter 18 under the control of microprocessor 20 into microprocessor memory 20. Once the information is in memory 20, it is processed or otherwise manipulated to determine shaft 8 angle through the implementation of appropriate algorithms and stored calibration data. This process can be carried out continuously many, many times per second.

Considerations for Device Accuracy, Resolution, and Sensitivity

Accuracy, resolution, and sensitivity are the next important aspects of the encoding device to address. These aspects are influenced by a number of things (though not necessarily the same things). Resolution and sensitivity will be used interchangeably and are related to the degree to which a change in shaft 8 angle $\Delta\theta$ can be sensed. For this device, these are weak functions of shaft 8 angle and depend entirely on geometry and the ability to resolve the exact location of the light spot on array 16 at the system level.

Refer to FIG. 2 for details on the geometry's nomenclature. First, I will describe the polygonal mirror 6 itself. Its two chief attributes are the number of facets $2_i$, "N", previously described, and what I will call the facet $2_i$ radius, "r", which is the perpendicular distance from the center of polygonal mirror 6 to the center of any facet $2_i$. The previously described sector angle will be called $\phi$. The facet length will be called 1 and is computed as:

$$l = \frac{r}{2\tan(\phi/2)}$$

Referring now to FIG. 3, I turn next to detector array 16 whose pixel dimension "p" along the array is typically in the range from 7 to 25 μm. The array length "a" is then simply the number of elements "e" times "p". This is most conveniently expressed in mm. The beam $4_R$ diameter "b" will also be described in mm. Beams $4_i$ and $4_R$ will either be Gaussian in profile as from a laser or formed from a spatial filter/collimator arrangement and will likely be diffraction-limited. In either case, I will assume that beam $4_R$ will be of Gaussian type, where "b" will refer to the diameter of beam $4_R$ at its 1/e power points. The details of the spatial distribution of beam 4 irradiance are not important as long as the distribution is invariant for each order as it traverses array detector 16.

Finally, I turn to the angular relationships of the device geometry (see FIG. 2). We begin by considering shaft 8 angle $\theta$ to be zero when facet number $2_0$ is horizontal and facing the bottom of FIG. 2 as shown. Again, the angle of incidence $\alpha$ of beam $4_i$ on a facet $2_i$ is relative to that facet's surface normal and depends on two things: one, the quantity we referred to earlier as $x_{off}$ which is a fractional quantity normalized to the facet radius describing the offset distance from shaft 8 center where beam $4_i$ strikes the polygon; and two, $\theta$ itself. The two other angles in this geometry, along with $x_{off}$, uniquely describe the placement of the linear, photodiode array 16 with respect to the polygon. One angle is called the "center $\beta$," $\beta_c$, defined as the angle between the facet normal and the perpendicular bisector of array 16 when incident beam $4_i$ strikes the center of any facet $2_i$. This defines a direction along which array 16 can be adjusted closer to or farther from polygonal mirror 6. The other angle is called the "beta halfrange," $\beta_{\frac{1}{2}}$, which describes the angel subtended by one-half of array 16 length as seen from the center of facet $2_i$ when incident beam $4_i$ strikes the center of a facet $2_i$. This angular subtense places array 16 at a unique position on the line described by $\beta_c$.

Resolution and Sensitivity

From FIG. 2, it is reasonably clear that the following things will place an upper bound on the angular resolution of the encoding device. These are: the beta halfrange $\beta_{\frac{1}{2}}$, the number of array elements "e", the pixel size "p", and to a less obvious degree beam $4_R$ diameter "b". Other things which will affect sensitivity of the encoder in such a way as to enhance it but which are not evident from FIG. 2 are: the ability to accurately compute the centroid location of the spot from digitally converted array data, multiple sampling (averaging) of light spot location data, and processing for redundant/additional channels with added computational constraints.

The least obvious but perhaps most important factor is the photometric accuracy with which the light spot can be digitally converted by the system. The photometric accuracy can be increased (but not without limit) by multiple sampling but at the expense of system bandwidth. This will be addressed later under analysis of anticipated performance.

Vibration will affect instantaneous resolution, but in a way which is common to all sensitive encoding devices. As such, vibration is outside of the scope of this disclosure.

Accuracy

As with any device, there are a characteristic set of things which will affect system accuracy. However, fortunately, in this case, most of these can be taken care of in a device calibration program—a worthwhile endeavor for any system seeking state-of-the-art performance. The other light in which to view the question of accuracy is "what might happen to change the calibration?"

The things that affect accuracy which can be calibrated out at the system level are: thermal/mechanical changes, distortions due to assembly, facet $2_i$ flatness, knowledge of dimensions, and knowledge of facet angle errors.

The choice of light source 12 is almost arbitrary as long as its spectral output is within the spectral response range of the selected detector 16. A moderate to narrow spectral bandpass may be desirable so that chromatic aberration in the collimating optics (if any) will be of no consequence.

Most if not all of the previously mentioned aspects can be minimized by appropriate component specifications to a degree which might obviate calibration altogether. Such specifications might include suitable optical flatness on facets $2_i$, materials with suitable stiffness and low coefficient of thermal expansion, etc. Mounting distortion can not be calibrated out unless calibration is performed after mounting which may not always be feasible. According to experts in the rotational encoder industry, currently the ultimate limitation of an encoder will be its bearings and shaft 8 coupling. Again, these mechanical aspects of encoder design are not within the scope of this disclosure. Here, we are concerned only with the aspects of encoders from which angular information is derived.

There are a few things which can affect the size of the diffracted spots on array 16 which in turn can be calibrated out. These are the size of source 12, the optical properties of any collimating optics 3, and facet $2_i$ flatness.

Analysis of Anticipated Performance

Because source 12 and detector array 16 are fixed with respect to each other, and polygonal mirror rotates with respect to these, the position of the reflected spot on array 16 is related to the difference between the incident and diffracted angles, i.e. to $\beta - \alpha$ which is just $2\beta$. There is thus a constant geometric angular amplification of two inherent in the system. The actual function for shaft 8 angle versus spot location would be would be linear except for the $\cos(\beta - \beta_c)$ obliquity factor that exists because of differences in light path length from a facet $2_i$ to the different parts of linear array detector 16 and also the modulation of that path length with the change of incident spot location on facets $2_i$ themselves as polygonal mirror 6 rotates.

For this device, design parameters are not critical and are generally selected to optimize packaging and compactness. What I currently believe to be a good set of baseline encoder parameters is reflected in an encoder design of 42% radial offset of incident beam $4_i$ from polygonal mirror 6 axis, 32 facets $2_i$, surfaces free of rulings (00 lines), and $\beta_{\frac{1}{2}} = 11.7°$ (nominally 12°). FIG. 4 illustrates the design in the context of the display of a visualization program. This design has been used to study system angular sensitivity. The linear array in this design is an Eastman Kodak device with 8000 pixels which are 9 $\mu$m $\times$ 9 $\mu$m in size.

Resolution will be defined as the geometric, angular increment corresponding to the minimum resolvable displacement of a light spot on linear pixel array 16. It turns out that its upper limit is established by the angular subtense of a pixel as seen by the point on a facet $2_i$ where source beam $4_i$ is incident, i.e. by $2 \cdot \beta_{\frac{1}{2}}/e$. Obviously, resolution is enhanced by having as many pixels of the least size possible in linear array 16. For the design under consideration, the geometric angular plate scale on array 16 is about 11" arc/pixel.

Due to the ability to compute the centroid of the light distribution of a spot on pixel array 16, resolution can be extended well below the single pixel level! A simulation has been performed to study CCD array 16 subsystem's capabilities in this regard. The simulation accounts for the following effects: beam 4 shape and size and irregularities therein, pixel-to-pixel photoresponse variation, system conversion noise, and repetitious sampling. In the simulation, a photoresponse for each array 16 pixel is chosen randomly within selectable prescribed limits. A target location for a perfect Gaussian profile is randomly chosen to fall somewhere on array 16. Then, a Gaussian whose half-width is selectable but whose pixel value at each pixel is randomly perturbed by some noise factor within selected limits, is computed along its effective centroid location and error relative to the foreknown target Gaussian center. If multiple samples have been specified, the average of that number of samples is considered to be the result. This is repeated one hundred times for each set of prescribed limits. Mean error, variance, and standard deviation are then computed for the one hundred samples.

The simulation was parameterized as follows. Three different Gaussian spot sizes (diameters) were tried: 0.40 mm, and 0.80 mm, and 1.6 mm diameters. Four different combinations of system noise and pixel-to-pixel variations were tried for each spot size. With one exception, two different numbers of samples—1 and 3—were tried for each combination of system noise and pixel-to-pixel variation. The parameterization is tabulated below.

TABLE I parameters for simulation of spot location determination by CCD array system for each of the three different spot sizes

| System Noise (%) | Pixel-to-pixel Variation (%) | Samples |
| --- | --- | --- |
| 3 | 2 | 1 |
| 3 | 2 | 4 |
| 2 | 1 | 1 |
| 2 | 1 | 3 |
| 1 | 1 | 1 |
| 1 | 1 | 3 |
| 0.5 | 0.5 | 1 |
| 0.5 | 0.5 | 3 |

Figure 5:
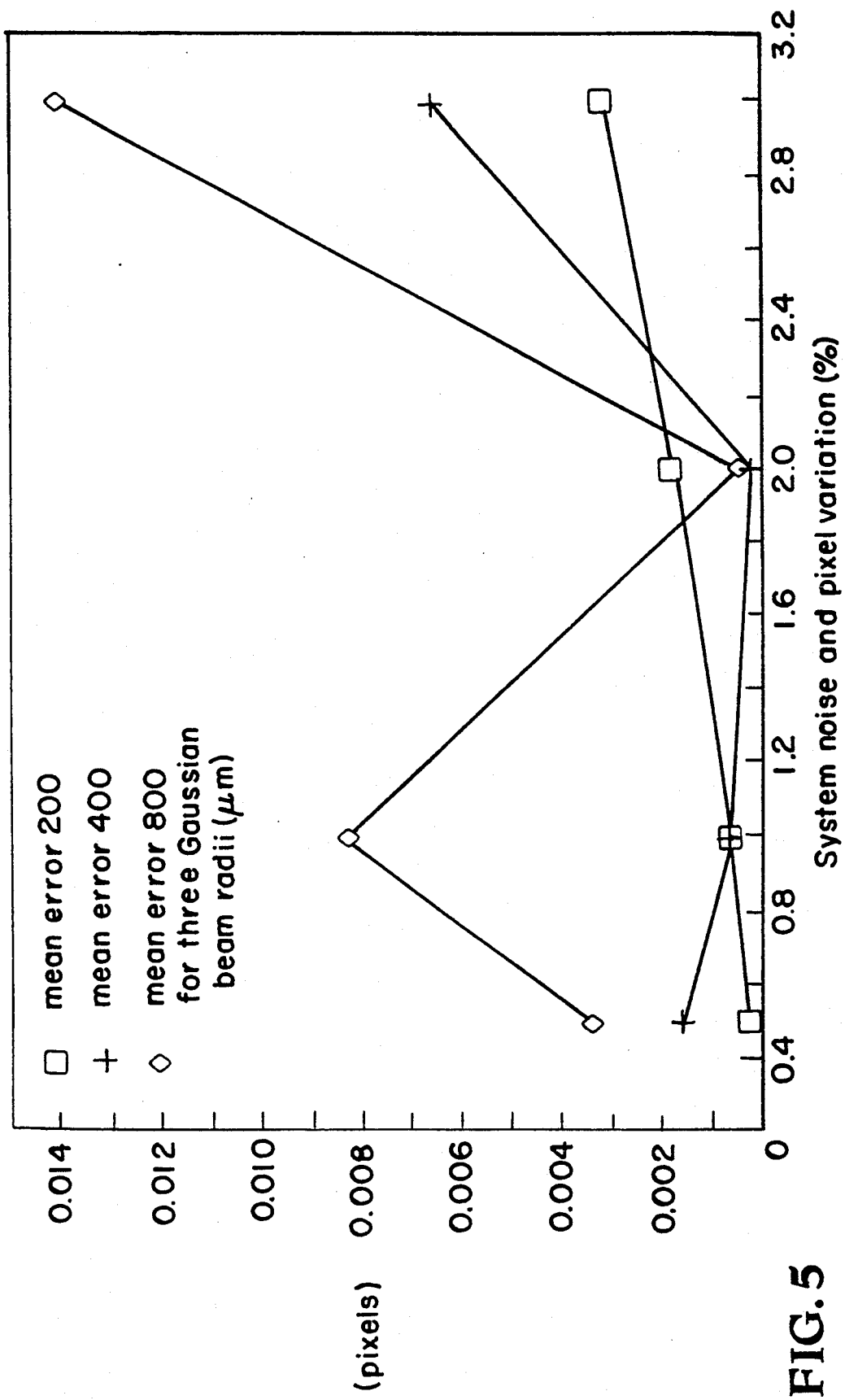
FIG. 5 is a graph showing mean error in determining spot location.
Figure 6:
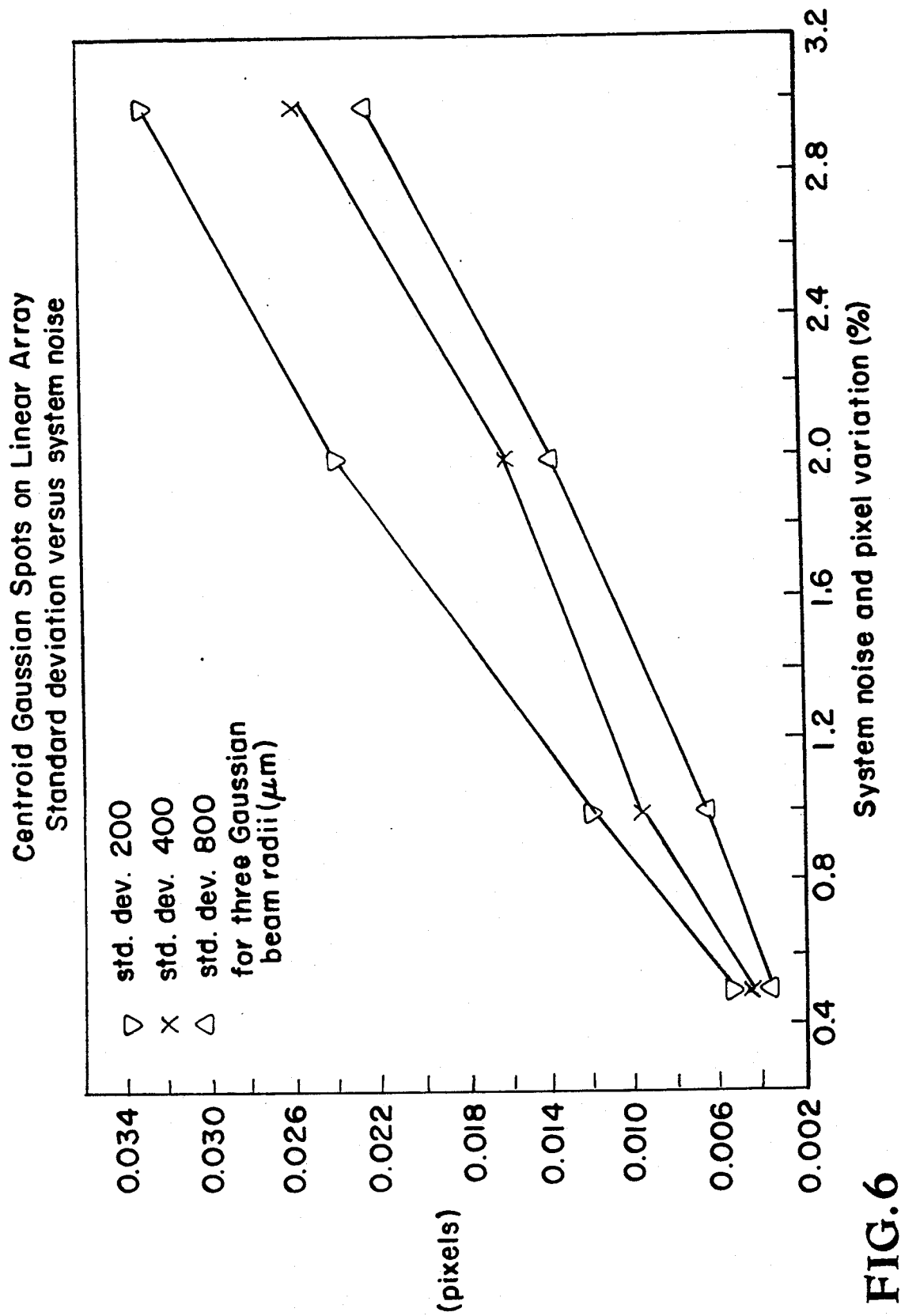
FIG. 6 is a graph showing standard deviation in determining spot location.

The results for mean error and standard deviation in pixels for single sample simulations are shown in FIGS. 5 and 6 respectively. The results indicate the two obvious things you would expect: that performance improves for 1) lower system noise and lower pixel-to-pixel variation and 2) smaller spot sizes. CCD experts at Eastman Kodak indicate that in practice, pixel-to-pixel variations and system noise can be systematically reduced to less than 0.5% each. This immediately focusses our attention to the left-hand part of the figures. Even for the largest spot size studied, 1.6 mm Gaussian diameter, the mean error and standard deviation are astoundingly only several millipixels!! To be conservative, we shall choose 0.005 pixels as an achievable number for centroided pixel resolution. This assumes we can get a spot size under 1.6 mm diameter. Assume we are using a compact HeNe laser with an exit spot diameter of 0.7 mm and a beam divergence of 1 mrad. The baseline design has a total path length roughly 0.4 m. This distance combines with the beam divergence to increase the spot size from 0.7 mm to 0.7+400*0.001=1.1 mm which is well less than 1.6 mm.

I am now in a position to predict the encoding device's angular sensitivity. One method for computing the device sensitivity is by equating sensitivity to the centroided pixel resolution times the geometric angular plate scale divided by the geometric sensitivity developed above.

$$0.005[\text{pixels}] \cdot 11[''\text{arc/pixel}]/2 = 0.028[''\text{arc}].$$

An alternate method invokes the use of a visualization program and a simple study of how many pixels are traversed by the spot as shaft 8 rotates through one unit of angle. For the design under consideration, this value is roughly 0.2" arc/pixel. Coupled with the ability to determine spot location to the 5 millipixel level, an angular sensitivity of 0.005 pixels/0.2 pixels per 1" arc change in shaft angle or 0.025" arc sensitivity is available!!!

This value compares favorably with the capabilities of the state-of-the-art, conventional optical encoder with 26 bit resolution—0.02" arc. According to NIST's Angular Measurements Laboratory in Gaithersburg, Md., the NIST angle calibration machine is not currently but will ultimately be good to 0.003" arc.

While the lower limit on the number "N" of facets $2_i$ is three, there is no intrinsic upper limit for "N". However, there are some practical concerns which lead to an optimum choice for "N". The fewer facets $2_i$ there are, the fewer facet-to-facet angle errors must be kept track of. This must be balanced against the desire to assign as little angular range to a given facet as possible in order to maximize resolution and minimize device size. Finally, it is convenient to have a number of facets $2_i$ which is a power of 2 so that facet $2_i$ identification can be done with a simple, piggy-backed, binary encoder. Based on my preliminary studies, it turns out that 32 is a good choice for number of facets $2_i$.

Adding source/detector channels could provide several advantages. Multiple independent samples offer improved certainty of angular determination, possible self-calibration, redundancy in the event of a failure of one channel, and some degree of immunity to defects in one or more facets or in one particular linear array. The disadvantages of multiple channels are slight increases in data storage requirements and computational/operational complexity, and a slight decrease in system conversion bandwidth.

I talked a little before about vibration. It is entirely possible that the encoding device could also be used to give information about the vibration environment in which it is used. This would be done either through time-averaged or even time-resolved computations on spot shape perturbations measured from linear array 16.

Although it can be highly advantageous to calibrate such a device, it is interesting to note that the device itself has intrinsic features which will allow it to be used with substantial accuracy without calibration. Furthermore, it is possible that the device might find application as either a secondary or perhaps even primary angular calibration standard.

To those skilled in the art, many modifications and variations of the present invention are possible in light of the above teachings. It is therefore to be understood that the present invention can be practiced otherwise than as specifically described herein and still will be within the spirit and scope of the appended claims.

I claim:

1. A high resolution device for encoding the angular displacement of a rotating shaft about its axis of rotation comprising:

a polygonal mirror having a plurality of facets thereon affixed to said shaft;

a light beam having an invariant spatial distribution directed towards said facets;

said facets of said polygonal mirror each reflecting in turn said light beam such that a light spot having an invariant spatial distribution is projected on a plurality of pixels on a position sensitive detector means;

an analog-to-digital converter means connected to said detector means for reading an output from said plurality of pixels upon which said light spot is projected;

processing and memory means connected to said analog-to-digital converter means to hold and manipulate data provided by said analog-to-digital converter means on the position of said spot and to compute the angular displacement of said shaft about its axis of rotation based upon a computation of the centroid of the light spot distribution upon said plurality of pixels upon which said light spot is projected.

2. The device of claim 1 further including a binary code encoder affixed to said polygonal mirror for identification of each of said plurality of facets.

3. The device of claim 2 wherein said light beam is emitted by a gas laser.

4. The device of claim 2 wherein said light beam is emitted by an LED.

5. The device of claim 2 wherein said light beam is emitted by a solid state laser.

6. The device of claim 2 wherein said light beam is emitted by a filament lamp and collimated by a lens.

7. The device of claim 2 wherein said light beam is directed towards said facets by a fiber optic cable after first passing through a collimator lens.

8. The device of claim 1 wherein said position sensitive detector means comprises a linear array detector means.

9. The device of claim 1 wherein said position sensitive detector means comprises a lateral photodiode detector means.

10. The device of claim 1 wherein said position sensitive detector means comprises an area array detector means.

11. The device of claim 8 wherein said linear array detector means contains a large plurality of diodes in the range of 256 to 8000 with very small pixel size in the range of 7–35 $\mu$m.

12. The device of claim 1 wherein said polygonal mirror has a number of facets thereon which are a power of 2.

13. The device of claim 12 wherein said polygonal mirror has 16 facets thereon.

14. The device of claim 12 wherein said polygonal mirror has 32 facets thereon.

15. The device of claim 2 wherein said invariant spatial distribution is Gaussian in profile.

16. The device of claim 2 wherein said invariant spatial distribution is diffraction limited.

17. The device of claim 15 wherein said light spot having a Gaussian spatial distribution has a diameter between 0.4 mm and 1.6 mm.

* * * * *